United States Patent
Biswal et al.

(10) Patent No.: US 9,947,918 B2
(45) Date of Patent: *Apr. 17, 2018

(54) POROUS SILICON PARTICULATES WITH MICROPORES AND MESOPORES WITHIN MACROPORES

(71) Applicants: William Marsh Rice University, Houston, TX (US); Lockheed Martin Corporation, Bethesda, MD (US)

(72) Inventors: Sibani Lisa Biswal, Bellaire, TX (US); Michael S. Wong, Houston, TX (US); Madhuri Thakur, Houston, TX (US); Steven L. Sinsabaugh, Uniontown, OH (US)

(73) Assignees: WILLIAM MARSH RICE UNIVERSITY, Houston, TX (US); LOCKHEED MARTIN CORPORATION, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/147,567

(22) Filed: May 5, 2016

(65) Prior Publication Data
US 2016/0293935 A1 Oct. 6, 2016

Related U.S. Application Data

(62) Division of application No. 14/149,055, filed on Jan. 7, 2014, now abandoned.
(Continued)

(51) Int. Cl.
*H01M 4/38* (2006.01)
*H01M 4/134* (2010.01)
(Continued)

(52) U.S. Cl.
CPC ............. *H01M 4/134* (2013.01); *C01B 33/02* (2013.01); *C25F 3/12* (2013.01); *H01M 4/1395* (2013.01);
(Continued)

(58) Field of Classification Search
CPC ........................................ H01M 4/38
See application file for complete search history.

(56) References Cited

U.S. PATENT DOCUMENTS

| | | | | |
|---|---|---|---|---|
| 2004/0121559 A1* | 6/2004 | Solanki | ............... | H01L 21/3063 438/460 |
| 2005/0136330 A1* | 6/2005 | Mao | ....................... | C25D 17/10 429/231.95 |

(Continued)

FOREIGN PATENT DOCUMENTS

| | | |
|---|---|---|
| WO | WO-2011154692 A1 | 12/2011 |
| WO | WO-2012141363 A1 | 10/2012 |

(Continued)

OTHER PUBLICATIONS

Office Action for Chinese Patent Application No. 201480004088.2, dated Nov. 28, 2017.*

(Continued)

*Primary Examiner* — Alex Usyatinsky
(74) *Attorney, Agent, or Firm* — Winstead PC

(57) ABSTRACT

Embodiments of the present disclosure pertain to porous silicon particulates and anode materials that contain them. In some embodiments, each of the porous silicon particulates include a plurality of macropores, mesopores and micropores such that the micropores and mesopores are within the macropores. The porous silicon particulates also contain: a coating associated with the porous silicon particulates; and a binding material associated with the porous silicon particulates. The binding material can include binders, carbon (Continued)

materials, polymers, metals, additives, carbohydrates, and combinations thereof.

15 Claims, 5 Drawing Sheets

Related U.S. Application Data

(60) Provisional application No. 61/749,636, filed on Jan. 7, 2013.

(51) Int. Cl.
| | | |
|---|---|---|
| H01M 4/62 | (2006.01) | |
| C01B 33/02 | (2006.01) | |
| C25F 3/12 | (2006.01) | |
| H01M 4/1395 | (2010.01) | |
| H01M 10/0525 | (2010.01) | |
| H01M 4/36 | (2006.01) | |
| H01M 10/052 | (2010.01) | |
| H01M 4/02 | (2006.01) | |

(52) U.S. Cl.
CPC ........... *H01M 4/386* (2013.01); *H01M 4/621* (2013.01); *H01M 4/622* (2013.01); *H01M 4/626* (2013.01); *H01M 10/0525* (2013.01); *C01P 2004/61* (2013.01); *C01P 2006/16* (2013.01); *H01M 4/366* (2013.01); *H01M 10/052* (2013.01); *H01M 2004/021* (2013.01); *H01M 2004/027* (2013.01)

(56) References Cited

U.S. PATENT DOCUMENTS

| | | | | |
|---|---|---|---|---|
| 2006/0088470 | A1* | 4/2006 | Larsson | B01J 20/0211 423/702 |
| 2008/0280140 | A1* | 11/2008 | Ferrari | C25F 3/12 428/402 |
| 2009/0029256 | A1* | 1/2009 | Mah | H01B 1/24 429/231.8 |
| 2009/0068553 | A1* | 3/2009 | Firsich | D21H 13/50 429/122 |
| 2009/0186267 | A1* | 7/2009 | Tiegs | B82Y 30/00 429/129 |
| 2011/0082024 | A1* | 4/2011 | Liu | A61K 9/51 502/5 |
| 2011/0111294 | A1* | 5/2011 | Lopez | H01M 4/134 429/217 |
| 2012/0244436 | A1* | 9/2012 | Kerlau | H01M 4/134 429/212 |
| 2013/0045420 | A1* | 2/2013 | Biswal | C25F 3/12 429/217 |

FOREIGN PATENT DOCUMENTS

| | | | |
|---|---|---|---|
| WO | WO2013/028598 | * | 2/2013 |
| WO | WO-2013028598 A1 | | 2/2013 |

OTHER PUBLICATIONS

Examination Report for European Patent Application No. 14735414.6, dated Feb. 19, 2018.*
Office Action for Chinese Patent Application No. 201480004088.2, dated May 3, 2017.
Examination Report for European Patent Application No. 14735414.6, dated Jul. 19, 2017.
Thakur, M., Sinsabaugh, S.L., Isaacson, M., Wong, M.S. & Biswal, S.L. Inexpensive method for producing macroporous silicon particulates (MPSPs) with pyrolyzed polyacrylonitrile for lithium ion batteries. *Scientific Report* 2 (2012).
Thakur, M. et al. Freestanding macroporous silicon and pyrolyzed polyacrylonitrile composite as an anode for lithium ion batteries. *Chemistry of Materials* 24, 2998-3003 (2012).
Iatsunskyi, Igor: "Peculiarities of Photoluminescence in Porous Silicon Prepared by Metal-Assisted Chemical Etching", ISRN Optics, vol. 2, No. 25, Jan. 1, 2012, pp. 3384-3386.
Tsujino, K., et al.: "Morphology of nanoholes formed in silicon by wet etching in solutions containing HF and H2O2 at different concentrations using silver nanoparticles as catalysts", Electrochimica Acta, Elsevier Science Publishers, Barking, GB, vol. 53, No. 1, Sep. 15, 2007, pp. 28-34.
Chartier, C., et al.: "Metal-assisted chemical etching of silicon in HF-H2O2", Electrochimica Acta, Elsevier Science Publishers, Barking, GB, vol. 53, No. 17, Jul. 1, 2008, pp. 5509-5516.

* cited by examiner

Silicon wafer → Etching → Porous silicon

POROUS SILICON PARTICULATES WITH MICROPORES AND MESOPORES WITHIN MACROPORES

CROSS-REFERENCE TO RELATED APPLICATIONS

This application is a divisional of U.S. Non-Provisional patent application Ser. No. 14/149,055, filed on Jan. 7, 2014, which claims priority to U.S. Provisional Patent Application No. 61/749,636, filed on Jan. 7, 2013. The entirety of each of the aforementioned applications is incorporated herein by reference.

STATEMENT REGARDING FEDERALLY SPONSORED RESEARCH

Not applicable

BACKGROUND

Current methods of making porous silicon particles suffer from numerous limitations, including efficiency, quality, electrochemical efficacy, and cost-effectiveness. Therefore, there is currently a need for new methods to produce porous silicon particles that address the aforementioned limitations.

SUMMARY

In some embodiments, the present disclosure pertains to methods of preparing porous silicon particulates. In some embodiments, the methods comprise: (a) electrochemically etching a silicon substrate, where the electrochemical etching comprises exposure of the silicon substrate to an electric current density, and where the electrochemical etching produces a porous silicon film over the silicon substrate; (b) separating the porous silicon film from the silicon substrate, where the separating comprises a gradual increase of the electric current density in sequential increments; (c) repeating steps (a) and (b) a plurality of times; (d) electrochemically etching the silicon substrate in accordance with step (a) to produce a porous silicon film over the silicon substrate; (e) chemically etching the porous silicon film and the silicon substrate; and (f) splitting the porous silicon film and the silicon substrate to form porous silicon particulates.

In some embodiments, the electrochemical etching comprises the use of an acid, such as hydrofluoric acid. In some embodiments, the electrochemical etching comprises exposure of the silicon substrate to an electric current density of about 1 mA/cm$^2$ to about 10 mA/cm$^2$. In some embodiments, the gradual increase of the electric current density during the separating step comprises an increase of the electric current density by about 1-2 mA/cm$^2$ per sequential increment.

In some embodiments, the chemical etching occurs by exposure of the porous silicon film and the silicon substrate to a metal (including transition metals and metalloids). In some embodiments, the metal is selected from the group consisting of silver, copper, chromium, gold, aluminum, tantalum, lead, zinc, silicon, and combinations thereof. In some embodiments, the exposure results in coating of the porous silicon film and the silicon substrate with the metal.

In some embodiments, the splitting occurs by at least one of physical grinding, crushing, sonication, ultrasonication, ultrasonic fracture, pulverization, ultrasonic pulverization, and combinations thereof. In some embodiments, the splitting occurs by ultrasonication.

In some embodiments, the methods of the present disclosure further comprise a step of associating the formed porous silicon particulates with a binding material. In some embodiments, the binding material is selected from the group consisting of binders, carbon materials, polymers, metals, additives, carbohydrates, and combinations thereof. In some embodiments, the binding material comprises a carbonized polyacrylonitrile.

In some embodiments, the methods of the present disclosure also include a step of controlling a thickness of the porous silicon film used to form the porous silicon particulates. In some embodiments, the thickness of the porous silicon film is controlled by adjusting one or more parameters selected from the group consisting of electric current density during electrochemical etching, resistivity of the silicon substrate during electrochemical etching, concentration of electrolyte etchants used during electrochemical or chemical etching, temperature during electrochemical or chemical etching, and combinations thereof.

Further embodiments of the present disclosure pertain to porous silicon particulates formed by the methods of the present disclosure. Additional embodiments of the present disclosure pertain to anode materials that contain the porous silicon particulates of the present disclosure. In some embodiments, the anode materials of the present disclosure have discharge capacities of at least about 600 mAh/g over at least 50 cycles. In some embodiments, the anode materials of the present disclosure have discharge capacities of at least about 1000 mAh/g over at least 50 cycles. In some embodiments, the anode materials of the present disclosure have Coulombic efficiencies of at least about 90% over at least 50 cycles.

In some embodiments, the anode materials of the present disclosure are utilized as components of energy storage devices, such as batteries. In more specific embodiments, the anode materials of the present disclosure are utilized as components of lithium ion batteries.

BRIEF DESCRIPTION OF FIGURES

FIG. 2 provides illustrations of methods of making porous silicon particulates.

DETAILED DESCRIPTION

Figure 1:
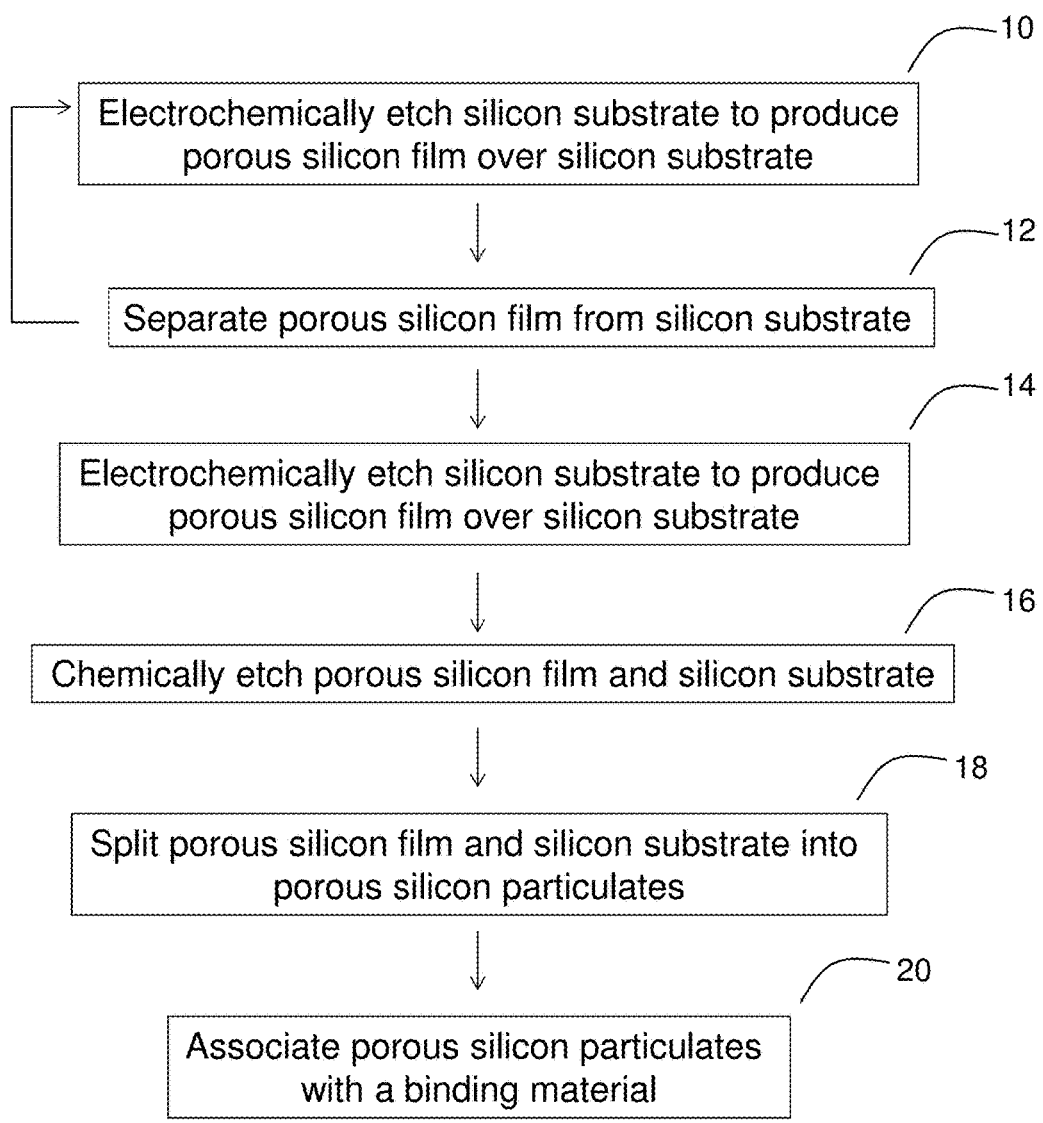
FIG. 1 provides a scheme of a method for making porous silicon particulates (PSPs).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Rechargeable batteries continue to draw attention because energy storage devices with higher energy storage capabilities are required for numerous applications. Researchers continue to focus on the development of new electrode materials with higher capacities and longer lifetimes for the major components of Li-ion batteries: cathode and anode. Therefore, developing new electrode materials with higher energy capacities can lead to significant improvements in the performance and lifetimes of the rechargeable batteries.

There are a number of new approaches that can be undertaken to create rechargeable batteries (e.g., lithium ion batteries) with higher energy capacities and longer life cycles. For instance, the capacity of lithium ion batteries generally depends on the amount of lithium (Li) ion an anode material can hold. A material that reacts with lithium at low potential is silicon. Presently, carbon-based materials (e.g. graphite) are utilized as anode materials in most rechargeable batteries.

At room temperature, the highest achievable specific capacity for silicon is 3579 mAhg$^{-1}$, far greater than the theoretical capacity of graphite (372 mAhg$^{-1}$). However, when silicon is lithiated, it undergoes a large volume expansion (~300%). This in turn causes severe cracking of the silicon and leads to electrode failure.

Many research groups have focused on exploring a variety of silicon-based nanostructures, such as nanosized particles, thin film, silicon nanowires, silicon nanotubes, core-cell nanowires, porous silicon (PSi), and interconnected silicon hollow nanospheres. Many of these structures have shown success in addressing the mechanical breaking issues associated with silicon.

Recently, composite materials of porous silicon and carbon have also shown promising results. For instace, Bang et al. have synthesized a macroporous silicon anode using silver (Ag) nanoparticles as a template to chemically etch silicon particles, and a thermal decomposition method to coat the anode with a carbon layer (*Advanced Energy Materials*, 2012, 2:878-883). The material demonstrated a capacity of 2050 mAhg$^{-1}$ for fifty cycles. Likewise, Kim et al. have synthesized mesoporous Si/carbon core-shell nanowires as well as three dimensional (3-D) porous silicon (c-Si) particles (*Nano Letters*, 2008, 8:3688-3691 and *Angewandte Chemie-International Edition*, 2008, 47:10151-10154). Ge et al. have also shown that silicon nanowires grown and then scraped off from a substrate can be combined with an alginate binder (*Nano Letters*, 2012, 12:2318-2323). They showed that this form of silicon with high porosity and large pore sizes results in materials with capacities over 1000 mAhg-$^1$ for hundreds of cycles.

Applicants have at least two pending patent applications on electrochemically etched porous silicon materials. The first patent application describes in some embodiments an electrochemically etched porous silicon with metal coatings and a freestanding macroporous silicon with pyrolyzed polyacrylonitrile (PPAN) infiltration (International Application No. PCT/US2010/054577, filed on Oct. 28, 2010). The second patent application describes in some embodiments a macroporous silicon micro-particulate with PPAN composite as an anode material for lithium ion batteries (U.S. patent application Ser. No. 13/589,588, filed on Aug. 20, 2012).

Applicants have also found that binder free metal-coated porous silicon with bulk silicon exhibits a higher capacity and good cycle life than other forms of binder free silicon materials, such as silicon nanowires. However, metal coatings may add to the cost of the materials.

Another limitation of porous silicon films with bulk silicon is that bulk silicon adds to the overall weight of the materials without adding to the specific capacity. The bulk silicon substrate can be removed by backside chemical etching processes. However, such processes usually result in waste of useful silicon materials.

To overcome the above limitations, Applicants have developed a method of producing porous silicon films from a silicon substrate by etching the silicon substrate through the application of current densities (U.S. patent application Ser. No. 13/589,588). This results in the formation of a porous silicon film over the silicon substrate. The porous silicon film can then be separated from the silicon substrate through a multi-step lift-off process that applies higher current densities during etching. As such, multiple films can be removed from a single wafer, thereby leading to less silicon waste.

A limitation of porous silicon films produced by Applicants' lift-off processes is that they may have limited processability in various circumstances. To design a more processable material, Applicants changed from a film structure to a particulate structure that can be combined with PAN (or any other binders) to form slurries that can be processed with standard coating technologies. Though the aforementioned materials promise much higher specific capacities and longer life cycles, the lift-off processes can lead to cracking of the silicon substrate due to its brittle nature before the lift-off of the layer. Therefore, the cracked silicon substrate cannot be reused. This in turn leads to waste of the silicon materials.

As such, current methods of making porous silicon particulates have limitations that need to be addressed. Various embodiments of the present disclosure address the aforementioned limitations.

In some embodiments, the present disclosure pertains to novel methods of preparing porous silicon particulates. In some embodiments, the present disclosure pertains to anode materials that include such porous silicon particulates.

Methods of Preparing Porous Silicon Particulates

In some embodiments, the present disclosure pertains to methods of preparing porous silicon particulates. In some embodiments illustrated in FIG. 1, the methods of the present disclosure include: electrochemically etching a silicon substrate to produce a porous silicon film over the silicon substrate (step 10); separating the porous silicon film from the silicon substrate (step 12); repeating steps 10 and 12 a plurality of times; electrochemically etching the silicon substrate in accordance with step 10 to produce a porous silicon film over the silicon substrate (step 14); chemically etching the porous silicon film and the silicon substrate (step 16); and splitting the porous silicon film and the silicon substrate to form porous silicon particulates (step 18). In some embodiments, the methods of the present disclosure also include a step of associating the porous silicon particulates with a binding material (step 20). In some embodiments, the methods of the present disclosure also include a step of controlling the thickness of the porous silicon films that are used to make the porous silicon particulates.

As set forth in more detail herein, the methods of the present dislcosure can have numerous embodiments. For instance, various silicon substrates, binding materials, electrochemical etching techniques, porous film separation techniques, chemical etching techniques, and splitting techniques may be utilized to form various types of porous silicon particulates.

Silicon Substrates

The methods of the present disclosure may utilize various types of silicon substrates. For instance, in some embodiments, the silicon substrates may include bulk silicon substrates. In some embodiments, the silicon substrates include crystalline silicon, semicrystalline silicon, amorphous silicon, doped silicon, coated silicon, silicon pre-coated with silicon nanoparticles, and combinations thereof.

In some embodiments, the silicon substrate is a silicon wafer. In some embodiments, the silicon substrate is a crystalline silicon wafer. In some embodiments, the silicon substrate is a doped silicon wafer. In some embodiments, the silicon substrate is a silicon wafer doped with boron, phosphorous, arsenic, antimony, other dopants, and combinations thereof. In some embodiments, the silicon substrate is a p-type silicon wafer, an n-type silicon wafer, and combinations thereof. In some embodiments, the silicon substrate may be an n-doped or a boron doped silicon wafer. The use of additional silicon substrates can also be envisioned.

Electrochemical Etching of Silicon Substrate

Various methods may also be utilized to electrochemically etch silicon substrates. In some embodiments, the electrochemical etching produces a porous silicon film over the silicon substrate. In some embodiments, the electrochemical etching may include the use of one or more strong acids, such as nitric acid ($HNO_3$), hydrofluoric acid (HF), sulfuric acid ($H_2SO_4$), hydrochloric acid (HCl), and combinations thereof. In more specific embodiments, the electrochemical etching of the silicon substrate occurs in the presence of hydrofluoric acid. In some embodiments, the electrochemical etching of the silicon substrate occurs in the presence of hydrofluoric acid in dimethylformamide (DMF).

In some embodiments, the electrochemical etching occurs in the presence of an applied electric field, such as an electric field with a constant electric current density. In some embodiments, electrochemical etching includes exposure of the silicon substrate to an electric current density. In some embodiments, the etching occurs by the use of a strong acid (e.g., HF) in the presence of an applied electric field.

In some embodiments, the applied electric field may contain various levels of electric current densities. In some embodiments, the electric current density is from about 0.5 mA/cm$^2$ to about 50 mA/cm$^2$. In some embodiments, the electric current density is from about 1 mA/cm$^2$ to about 10 mA/cm$^2$. In some embodiments, the maximum electric current density is about 20 mA/cm$^2$. In some embodiments, the electric current density is applied to a silicon substrate in an electrochemical cell.

During electrochemical etching, an electric current density may be applied to silicon substrates in one or more increments. In some embodiments, the etching process may include from 1 increment to about 10 increments. In some embodiments, the electric current density may be from about 1 mA/cm$^2$ to about 20 mA/cm$^2$ per increment. In some embodiments, each increment may last from about 30 seconds to about 60 minutes. In some embodiments, each increment may last for about 10 minutes. In some embodiments, the increments may be separated by intervals. In some embodiments, the intervals may be from about 30 seconds to about 30 minutes.

In addition, silicon substrates may be exposed to various current densities for various periods of time. For instance, in some embodiments, electrochemical etching occurs for about 3 hours to about 5 hours. In more specific embodiments, electrochemical etching occurs by exposure of silicon substrates to electric current densities of 1 mA/cm$^2$ to 10 mA/cm$^2$ for about 1 hour to about 4 hours.

Separating Porous Silicon Film from Silicon Substrate

Various methods may also be utilized to separate the formed porous silicon films from silicon substrates (also referred to as a "lift-off" procedure). In various embodiments, such separation steps can occur during or after electrochemical etching.

In some embodiments, the separating includes a gradual increase of the electric current density in sequential increments until the porous silicon film has been separated from the silicon substrate. As used herein, a gradual increase in electric current density generally refers to a stepwise increase in electric current density over several sequential increments. For instance, in some embodiments, the electric current density may increase gradually in at least 5-10 sequential increments that may last from about 30 seconds to 60 minutes per increment. In some embodiments, the gradual increase in electrical current density may occur through at least 5 to 10 sequential increments that may be separated by intervals of about 30 seconds to 60 minutes per increment.

In some embodiments, the applied electric current density may be from about 0.5 mA/cm$^2$ to about 50 mA/cm$^2$. In some embodiments, the electric current density may gradually increase from about 1 mA/cm$^2$ to about 2 mA/cm$^2$ per increment. In some embodiments, the maximum electric current density may be about 15 mA/cm$^2$. In some embodiments, the electric current density may gradually increase in small increments of 1 mA/cm$^2$ at 10-60 minutes per increment for up to 15 mA/cm$^2$. In some embodiments, the electric current density may gradually increase in 13 sequential increments by at least about 1 mA/cm$^2$ per increment for up to 15 mA/cm$^2$. In some embodiments, the electric current density may gradually increase in small increments of 0.5 mA/cm$^2$ at 1-2 hours per increment for up to 20 mA/cm$^2$.

Without being bound by theory, it is envisioned that the aforementioned "lift off" procedures may occur through various mechanisms. For instance, in some embodiments that utilize HF as an electrochemical etchant, it is envisioned that, as the depth of the pores in the formed porous silicon films increases, the availability of fluoride ions at the pore tip decreases. Such a decrease may in turn lead to isotropic etching at the tip of the pores, thereby resulting in a layer of silicon that is more porous at the point of contact with the silicon substrate. See, e.g., FIG. 2A. In this embodiment, it is also envisioned that the hydrogen byproduct accumulates and starts to exert a hydrodynamic pressure onto the walls of the pores. At some point, the pore walls may not be able to withstand this hydrodynamic pressure. This in turn may lead to separation of the porous silicon film from the silicon substrate.

The separation or "lift off" procedures of the present disclosure may also include additional steps. For instance, in some embodiments, separation steps may also include a step of physically removing the formed porous silicon film from the silicon substrate. In some embodiments, the physical removal may occur by the use of a razor blade, a tweezer, or other objects. In some embodiments, the physical removal may occur by a rinsing step or a washing step.

Repetition of Electrochemical Etching and Separation Steps

In some embodiments, the electrochemical etching and separation steps are repeated a plurality of times. For instance, in some embodiments, the electrochemical etching and separation steps are repeated more than 5 times. In some embodiments, the electrochemical etching and separation steps are repeated more than 10 times. In some embodiments, the electrochemical etching and separation steps are repeated until the porous silicon film becomes inseparable from the silicon substrate. In some embodiments, the electrochemical etching and separation steps are repeated until the silicon substrate develops one or more cracks.

Chemical Etching of the Porous Silicon Film and Silicon Substrate

After repeating the steps of electrochemical etching and porous silicon film separation for a desired number of times, the methods of the present disclosure can include a final step of electrochemically etching the silicon substrate to produce a porous silicon film over the silicon substrate. Thereafter, the porous silicon film and the silicon substrate may be chemically etched.

Various methods may also be utilized to chemically etch the porous silicon films and the silicon substrates of the present disclosure. For instance, in some embodiments, the chemical etching occurs by exposure of the porous silicon film and the silicon substrate to a metal (including transition metals and metalloids). In some embodiments, the metal includes at least one of silver, copper, chromium, gold, aluminum, tantalum, lead, zinc, silicon and combinations thereof. In some embodiments, the metal is silver. In more specific embodiments, the metal includes silicon, such as silicon nitride, silicon oxide, and combinations thereof.

The exposure of the porous silicon films and the silicon substrates of the present disclosure to a metal can have various effects. For instance, in some embodiments, the exposure results in coating of the porous silicon film and the silicon substrate with metals. In some embodiments, the coating may be uniform and homogenous. In some embodiments, the exposure may result in the partial coating of the porous silicon film and the silicon substrate with metals. In some embodiments, the exposure may result in the full coating of the porous silicon film and the silicon substrate with metals. In some embodiments, the porous silicon film and the silicon substrate may become infiltrated with or embedded with the metals.

Splitting of the Porous Silicon Film and the Silicon Substrate

In some embodiments, a chemical etching step is followed by splitting the porous silicon film and the silicon substrate to form porous silicon particulates. Various splitting methods may be utilized for such purposes. For instance, in some embodiments, the splitting occurs by at least one of physical grinding, crushing, sonication, ultrasonication, ultrasonic fracture, pulverization, ultrasonic pulverization, and combinations thereof. In more specific embodiments, the splitting occurs by ultrasonication.

Association of Porous Silicon Particulates with Binding Materials

In some embodiments, the porous silicon particulates may also be associated with one or more binding materials. In various embodiments, the association may occur prior to, during, or after porous silicon particulate formation.

Binding materials generally refer to materials that may enhance the electric conductivity or stability of porous silicon films. In some embodiments, the binding materials may include at least one of binders, carbon materials, polymers, metals, additives, carbohydrates, and combinations thereof.

In some embodiments, the binding materials may include a polymer. In some embodiments, the polymer may include at least one of polyacrylonitrile (PAN), pyrolyzed polyacrylonitrile (PPAN), polyvinylidene difluoride (PVDF), polyacrylic acid (PAA), carboxymethyl cellulose (CMC), and combinations thereof. In some embodiments, the polymers may be in polymerized form prior to association with porous silicon particulates. In some embodiments, the polymers may polymerize during or after association with porous silicon particulates.

In some embodiments, the binding material is an additive. In some embodiments, the additive is sodium alginate.

In some embodiments, the binding materials may include one or more metals. In some embodiments, the metals may include, without limitation, gold, copper, silver, titanium, iron, and combinations thereof.

In some embodiments, the binding materials may include one or more carbon materials. Non-limiting examples of suitable carbon materials include carbon nanotubes, carbon black, graphite, carbon fibers, carbon nanofibers, graphene sheets, fullerenes, graphene platelets, sodium alginate binders associated with carbon black, carbohydrates, and combinations thereof. In some embodiments, the binding material includes a carbohydrate. In some embodiments, the carbohydrate is glucose.

In addition, various methods may be used to associate binding materials with porous silicon particulates. In some embodiments, the association may occur by sputtering, spraying, or physically applying the one or more binding materials onto the porous silicon particulates. In some embodiments, the association may occur by dipping the porous silicon particulates into a solution containing one or more binding materials.

In some embodiments, the association may result in the partial coating of the porous silicon particulates with a binding material. In some embodiments, the association may result in the full coating of the porous silicon particulates with a binding material. In some embodiments, the porous silicon particulates may become infiltrated with, embedded with or dispersed in the binding materials.

In some embodiments, the binding materials that are associated with porous silicon particulates may be in carbonized form. In some embodiments, the binding materials may become carbonized before, during, or after association with the porous silicon particulates. In some embodiments, the binding materials may become carbonized by pyrolysis before, during or after association with porous silicon particulates. In more specific embodiments, the binding materials may include PAN that has been carbonized by pyrolysis after association with porous silicon particulates. In some embodiments, pyrolysis may occur by heating porous silicon particulates at high temperatures (e.g., 550° C.) in the presence of an inert gas (e.g., Argon).

In some embodiments, the binding material includes a carbonized polyacrylonitrile. An advantage of using carbonized PAN as a binding material is that it forms conjugated carbon chains upon carbonization. This in turn can enhance the electrical properties of the porous silicon particulates.

Control of Thickness of Porous Silicon Films

In some embodiments, the methods of the present disclosure also include a step of controlling a thickness of the porous silicon films that are used to form the porous silicon particulates. Various methods may also be utilized to control the thickness of the porous silicon films. For instance, in some embodiments, the thickness of the porous silicon films is controlled by adjusting one or more parameters. In some embodiments, the controllable parameters include at least one of electric current density during electrochemical etching, resistivity of the silicon substrate during electrochemical etching, concentration of electrolyte etchants used during electrochemical or chemical etching, placement of the electrode, process temperature, temperature during electrochemical or chemical etching, and combinations thereof.

Formed Porous Silicon Particulates

The methods of the present disclosure may be utilized to form various types of porous silicon particulates. For instance, in some embodiments, the formed porous silicon particulates include a plurality of pores. In some embodiments, the pores include various diameters. In some embodiments, the pores of the porous silicon particulates include diameters between about 1 nanometer to about 5 micrometers. In some embodiments, the pores include macropores with diameters of at least about 50 nm. In some embodiments, the pores include macropores with diameters between about 50 nanometers to about 3 micrometers. In some embodiments, the pores include macropores with diameters between about 500 nanometers to about 2 micrometers. In some embodiments, the pores include mesopores with diameters of less than about 50 nm. In some embodiments, the pores include micropores with diameters of less than about 2 nm.

By way of background, porous materials have been classified according to their pore diameters. For instance, micropores are those with diameters less than 2 nm. Mesopores have diameters that range from 2 nm to 50 nm. Macropores have diameters that are greater than 50 nm. In further embodiments, the pores in the formed porous silicon particulates may include various combinations of micropores, mesopores and macropores. For instance, in some embodiments, the porous silicon particulates include hierarchical pores. In some embodiments, the hierarchical pores include micropores and mesopores within macropores.

The pores in the formed porous silicon particulates can also have various arrangements. For instance, in some embodiments, the formed porous silicon particulates include pores that span at least 50% of a thickness of the porous silicon particulates. In some embodiments, the formed porous silicon particulates include pores that span an entire thickness of the porous silicon particulates.

The formed porous silicon particulates can also have various thicknesses. For instance, in some embodiments, the formed porous silicon particulates have thicknesses ranging from about 10 micrometers to about 200 micrometers. In more specific embodiments, the formed porous silicon particulates have thicknesses ranging from about 10 micrometers to about 50 micrometers.

The formed porous silicon particulates can also have various diameters. For instance, in some embodiments, the porous silicon particulates include diameters from about 1 μm to about 50 μm. In some embodiments, the porous silicon particulates include diameters from about 10 μm to about 20 μm.

The porous silicon particulates of the present disclosure can also have various electrical properties. For instance, in some embodiments, the porous silicon particulates of the present disclosure have discharge capacities of at least about 600 mAh/g over numerous cycles, such as at least 20 cycles, at least 40 cycles, at least 50 cycles, at least 60 cycles, at least 80 cycles, at least 100 cycles, at least 120 cycles, at least 140 cycles, at least 160 cycles, at least 180 cycles, at least 200 cycles, or at least 220 cycles. In more specific embodiments, the porous silicon particulates of the present disclosure have discharge capacities of at least about 1,000 mAh/g over numerous cycles, such as at least 20 cycles, at least 40 cycles, at least 50 cycles, at least 60 cycles, at least 80 cycles, at least 100 cycles, at least 120 cycles, at least 140 cycles, at least 160 cycles, at least 180 cycles, at least 200 cycles, or at least 220 cycles. In some embodiments, the porous silicon particulates of the present disclosure have Coulombic efficiencies of at least about 90% over numerous cycles, such as at least 20 cycles, at least 40 cycles, at least 50 cycles, at least 60 cycles, at least 80 cycles, at least 100 cycles, at least 120 cycles, at least 140 cycles, at least 160 cycles, at least 180 cycles, at least 200 cycles, or at least 220 cycles.

Anode Materials

Further embodiments of the present disclosure pertain to anode materials. In some embodiments, the anode materials include the porous silicon particulates of the present disclosure. In more specific embodiments, the anode materials of the present disclosure include: (1) porous silicon particulates with a plurality of pores; (2) a coating associated with the porous silicon particulates; and (3) a binding material associated with the porous silicon particulates.

The porous silicon particulates in the anode materials of the present disclosure can have various types of pores. For instance, in some embodiments, the pores include diameters between about 1 nanometer to about 5 micrometers. In some embodiments, the pores include diameters of at least about 50 nm. In some embodiments, the pores include diameters of less than about 50 nm. In some embodiments, the pores include diameters of less than about 2 nm. In some embodiments, the porous silicon particulates in the anode materials include hierarchical pores. In some embodiments, the hierarchical pores include micropores and mesopores within macropores.

In some embodiments, the porous silicon particulates include pores that span at least 50% of a thickness of the porous silicon particulates. In some embodiments, the porous silicon particulates include pores that span an entire thickness of the porous silicon particulates. In some embodiments, the porous silicon particulates have thicknesses ranging from about 10 micrometers to about 200 micrometers.

The porous silicon particulates in the anode materials of the present disclosure may also be associated with various types of coatings. For instance, in some embodiments, the porous silicon particulates may be associated with metal coatings. In some embodiments, the metal coatings may include, without limitation, silver, copper, chromium, gold, aluminum, tantalum, lead, zinc, silicon, and combinations thereof. In more specific embodiments, the metal coating is silver.

The porous silicon particulates in the anode materials of the present disclosure may also be associated with various types of binding materials. For instance, in some embodiments, the binding materials may include at least one of binders, carbon materials, polymers, metals, additives, carbohydrates, and combinations thereof. In some embodiments, the binding materials may include polymers. In some embodiments, the polymers may include at least one of polyacrylonitrile (PAN), pyrolyzed polyacrylonitrile (PPAN), polyvinylidene difluoride (PVDF), polyacrylic acid (PAA), carboxymethyl cellulose (CMC), and combinations thereof. In more specific embodiments, the binding materials may include carbonized polyacrylonitriles, carbohydrate (e.g., glucose), additives (e.g., sodium alignate), and combinations thereof.

The porous silicon particulates in the anode materials of the present disclosure may also have various diameters. For instance, in some embodiments, the porous silicon particulates include diameters from about 1 µm to about 50 µm.

The anode materials of the present disclosure can also have various electrical properties. For instance, in some embodiments, the anode materials of the present disclosure have discharge capacities of at least about 600 mAh/g over numerous cycles, such as at least 20 cycles, at least 40 cycles, at least 50 cycles, at least 60 cycles, at least 80 cycles, at least 100 cycles, at least 120 cycles, at least 140 cycles, at least 160 cycles, at least 180 cycles, at least 200 cycles, or at least 220 cycles. In more specific embodiments, the anode materials of the present disclosure have discharge capacities of at least about 1,000 mAh/g over numerous cycles, such as at least 20 cycles, at least 40 cycles, at least 50 cycles, at least 60 cycles, at least 80 cycles, at least 100 cycles, at least 120 cycles, at least 140 cycles, at least 160 cycles, at least 180 cycles, at least 200 cycles, or at least 220 cycles. In some embodiments, the anode materials of the present disclosure have Coulombic efficiencies of at least about 90% over numerous cycles, such as at least 20 cycles, at least 40 cycles, at least 50 cycles, at least 60 cycles, at least 80 cycles, at least 100 cycles, at least 120 cycles, at least 140 cycles, at least 160 cycles, at least 180 cycles, at least 200 cycles, or at least 220 cycles.

The anode materials of the present disclosure may also be associated with various types of energy storage devices. For instance, in some embodiments, the anode materials of the present disclosure may be associated with batteries. In more specific embodiments, the anode materials of the present disclosure may be associated with lithium ion batteries.

Applications and Advantages

In the present disclosure, Applicants have developed novel processes that can be utilized to generate large quantities of porous silicon particulates in a cost effective and efficient manner. Furthermore, the porous silicon particulates of the present disclosure have various advantageous properties, such as enhanced discharge capacities and enhanced Coulombic efficiencies over numerous cycles. As such, the methods and porous silicon particulates of the present disclosure can find numerous applications.

For instance, in some embodiments, the porous silicon particulates of the present disclosure can be utilized as anode materials for various types of energy storage devices in numerous fields, including the defense industry, the automotive industry, the renewable energy industry, the aerospace industry, the telecommunication industry, information technology, consumer electronics, implantable devices, and electric vehicles. In more specific embodiments, the porous silicon particulates of the present disclosure can be utilized as anode materials in batteries, such as lithium ion batteries.

In fact, Applicants envision that the methods and porous silicon particulates of the present disclosure can improve the performance and lower the cost of high performance anode materials in many energy storage devices, such as lithium ion batteries. For instance, batteries that contain the porous silicon particulates of the present disclosure have potential discharge capacities up to an order of magnitude higher than today's lithium ion batteries. As such, Applicants envision that batteries containing the porous silicon particulates of the present disclosure can provide optimal cycleability and capacities of 1000 mAhg$^{-1}$ for hundreds of cycles.

In more specific embodiments, the methods and porous silicon particulates of the present disclosure can provide additional advantages and applications, including use as improved anode materials for lithium ion batteries; use for development of lithium ion batteries with improved cycling behavior and high capacity, which can be 1000 mAhg$^{-1}$ for more than 200 cycles; use as low cost methods for manufacturing anodes for lithium ion batteries; use as reproducible methods for making anode battery materials; and use for development of lithium ion batteries with substantially higher discharge capacities than current batteries.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

EXAMPLE 1. Generation of Hierarchical Porous Silicon Particulates

This Example illustrates a combined electrochemical/chemical etching process to generate porous silicon micron size particulates as an anode for lithium ion batteries.

In this Example, the silicon wafer is first electrochemically etched to a depth of a few hundreds of microns. Next, the porous film is electrochemically lifted-off. This process is repeated until the remaining wafer is thinned and begins cracking. Once the wafer starts cracking, the wafer is chemically etched and crushed.

Figure 3A:
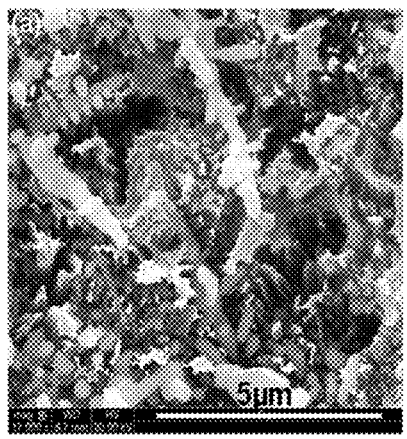
FIG. 3 provides SEM images of electrochemically and chemically etched porous silicon particulates (FIG. 3A) and chemically etched porous silicon particulates (FIG. 3B). Additional images of electrochemically and chemically etched porous silicon particulates are shown in FIGS. 3C-E.
Figure 3B:
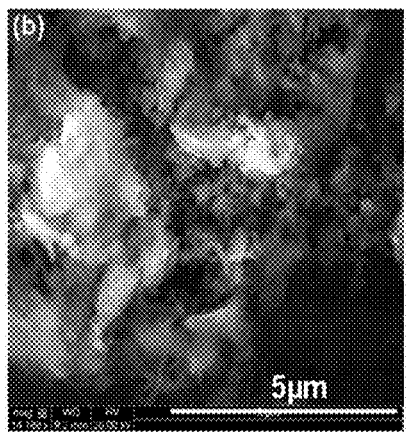
Figure 3C:
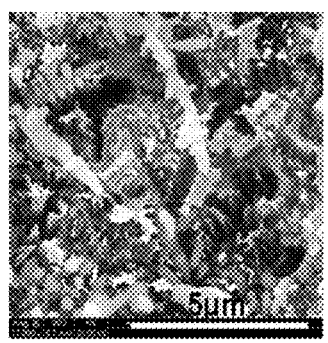
Figure 3D:
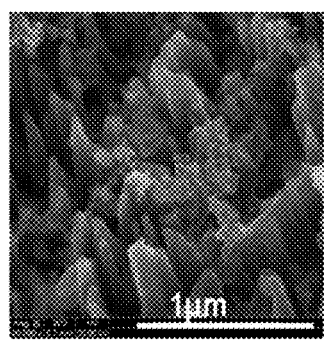
Figure 3E:
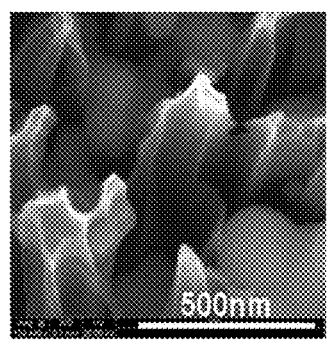

Applicants have tested these electrochemically/chemically etched porous silicon particulates as anode materials for lithium ion batteries. To compare the results, Applicants have done controlled experiments. Initially, a porous silicon film is formed by electrochemically etching at room temperature with constant current density of 1-5 mA/cm$^2$ for 3-5 hour, resulting in a wafer composed of a porous silicon layer with a thickness of 10-200 μm. Next, chemical etching is performed by placing the previously electrochemically etched wafer into solution silver nitrate/hydrofluoric acid solution that is in a 1:10 ratio by volume for 1-10 minutes. The wafer is transferred to a chemical etchant solution (10 ml of HF and 0.1 ml of 30% hydrogen peroxide ($H_2O_2$)) for 10-120 minutes. The electrochemically/chemically etched wafers are ultrasonically crushed into a particulate format. FIGS. 3A-B show the scanning electron microscopic (SEM) images for electrochemically/chemically etched (FIG. 3A) and chemically etched (FIG. 3B) porous silicon particulates. Additional images of the electrochemically/chemically etched porous silicon particulates are shown in FIGS. 3C-E.

Figure 4:
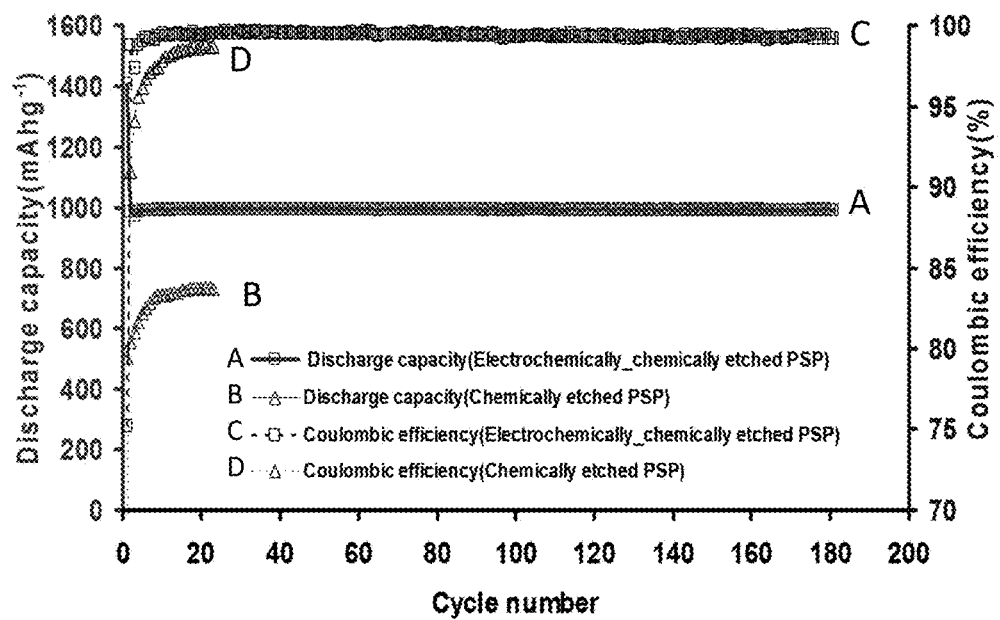
FIG. 4 shows discharge capacity and efficiency vs. cycle number of the porous silicon particulates of FIG. 3 during galvanostatic charge/discharge studies. Discharge capacity (red square, A) and coulombic efficiency (blue square, C) for electrochemically and chemically etched porous silicon particulates and discharge capacity (red triangle, B) and coulombic efficiency (blue triangle, D) for chemically etched porous silicon particulates are shown.

FIG. 4 shows the cycle performance of the electrochemically/chemically etched porous silicon particulates in comparison to the chemically etched porous silicon particulates (PSP) (controlled). The mass of the anode materials was 1.5 mg/cm$^2$. The anode materials are mixed with the Polyacrylonitrile (PAN) in a ratio of 7:3 and coated on the stainless steel foil. The coated porous silicon particulates/PAN composite are pyrolyzed at 550° C. at argon atmosphere. Both the materials are charged/discharged at 500 mAcm$^2$ between 0-1 V at a constant charge capacity of 1000 mAhg$^{-1}$. As suggested by Obrovac et al. (*Journal of the Electrochemical Society*, 2007, 154:A103-A108), the volume expansion of the silicon can be control by limiting the intercalation of the lithium into the silicon. Cui et al. (*Nano Letters*, 2009, 9:491-495) also found that limiting the intercalation of the silicon between 30-50% of the maximum specific capacity resulted in extended life cycle, and that charging silicon microparticles and nanoparticles at constant charge capacity increased the life cycle of the anode.

To control the intercalation of lithium ion to Applicants' material, Applicants fixed the charge capacity in the electrochemical tests at 1000 mAhg$^{-1}$. Applicants observed that the maintenance of the charge capacity greatly improved the number of useful cycles in the cell. For the controlled experiment, Applicants saw an increase in the capacity for first few cycles, but it was not able to reach the cutoff charge capacity (1000 mAhg$^{-1}$). The increase in the capacity for first few cycle is similar to Applicants' previous porous silicon studies, where the increase in the capacity is due to the phase transfer of the crystalline silicon to the amorphous silicon (*Journal of Power Sources*, 2012, 205:426-432). FIG. 4 shows that the electrochemical performance of electrochemically/chemically etched porous silicon particulates is much better as compared to the chemically etched porous silicon particulates. Without being bound by theory, it is envisioned that the increase in the capacity of the electrochemically/chemically etched porous silicon particulates in comparison to the chemically etched porous silicon particulates is due to more pores on the surfaces and walls of the silicon particulates. Applicants also envision that the increase in the capacity of the electrochemically/chemically etched porous silicon particulates in comparison to the chemically etched porous silicon particulates is also due to different pore geometries on the silicon particulates, such as macropores (>50 nm), mesopores (<50 nm) and micropores (<2 nm). See, e.g., FIG. 2A.

Figure 5:
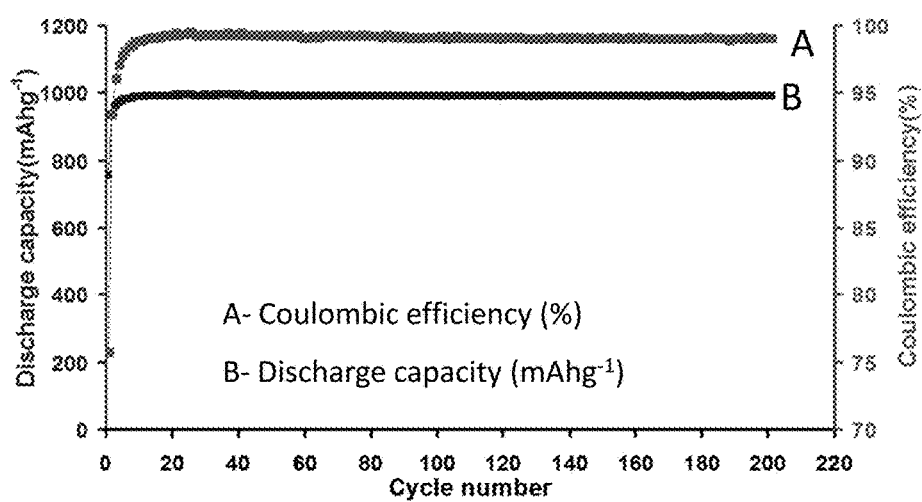
FIG. 5 provides discharge capacity and efficiency vs. cycle number of porous silicon particulates when used as anodes along with cathode materials (i.e., lithium cobalt oxide (LiCoO$_2$)) during galvanostatic charge/discharge between 2.8-4V at a constant charge capacity of 1000 mAhg$^{-1}$.

The electrochemically/chemically etched porous silicon particulates were also tested in the full cell by using lithium cobalt oxide ($LiCoO_2$) as a cathode material. The mass of the anode is 0.001 g/cm$^2$, and the mass of the cathode material ($LiCoO_2$ with carbon black and Polyvinylidene fluoride (PVDF)) is 0.002 g/cm$^2$. The capacity of the full cell was calculated based on the mass of the anode materials. FIG. 5 shows the cycle performance of the full cell.

EXAMPLE 1.1. Electrochemical Etching

The porous silicon was synthesized via electrochemical etching of silicon wafer using a multistep lift-off process. The thickness of the porous silicon films can be modified by controlling the etching parameters such as applied current, wafer resistivity, concentration of electrolyte and doping of the wafer. In porous silicon, prime grade, boron doped, p-type (100) silicon wafers (Siltronix Corp, silicon sense and silicon quest) were used. The wafer presented has a thickness of 275±25 m with an average resistivity between 14-22 ohm-cm and 10-30 ohm–cm. To fabricate porous silicon, pores are etched into the wafers at a constant current density delivered by an Agilent power supply (E3612A) at room temperature. The etching solution is composed of 20-30 mL dimethylformamide (DMF, Sigma Aldrich) and 2-4 mL 49% HF (Fisher Scientific) solution. The formation of the pores takes place when the number of fluoride ions was greater than the number of holes ([F–]>[h+]). The porous silicon etched can have an average diameter of 500 nm-2 μm and a depth between 10 μm-200 μm depending on etching time. Initially, a porous silicon film is formed by etching at room temperature with constant current density of 1-5 mA/cm$^2$ for 3-5 hours. This results in the formation of a porous silicon layer with a thickness of 10 μm-200 μm.

Figures 2A, 2B, 2C:
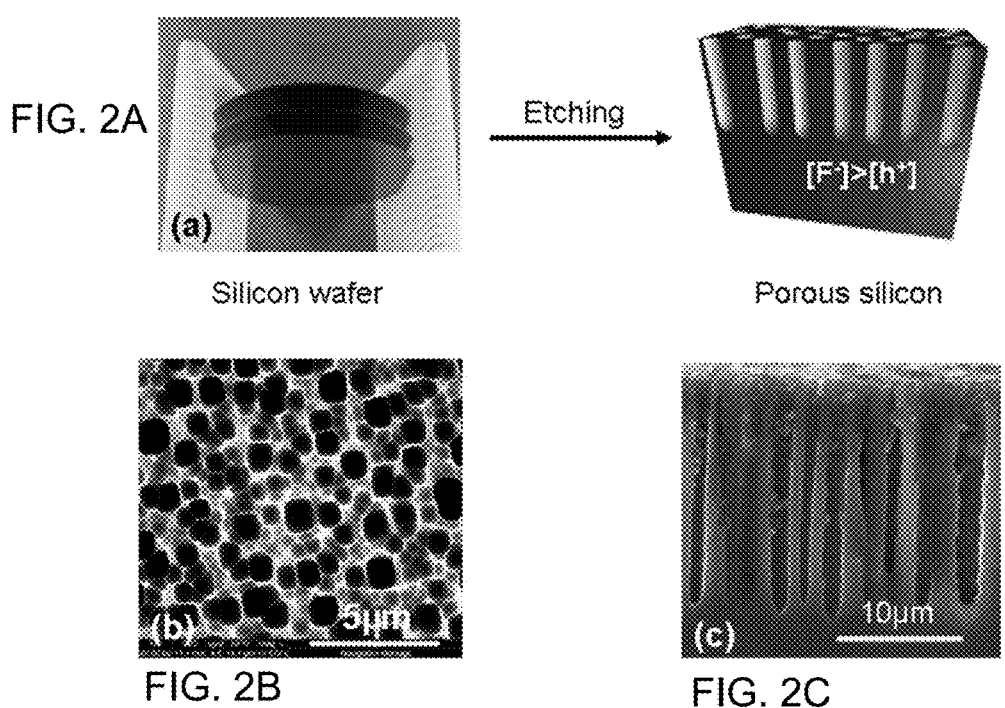
FIG. 2A provides an illustration of porous silicon film formation from a silicon wafer at a current density of 1-10 mA/cm$^2$ for 1-4 hours.
FIGS. 2B-2C provide scanning electron microscope (SEM) images for the top view (FIG. 2B) and the side view of porous silicon films (FIG. 2C).

This above etching conditions generated the porous silicon films shown in FIG. 2A (right panel). The SEM images for the top and side views of the porous silicon films are shown in FIGS. 2B and 2C, respectively.

EXAMPLE 1.2. Electrochemical Liftoff of Porous Silicon Films

The formed porous silicon films were lifted off from the silicon substrate multiple times by increasing the current density during the electrochemical etching process. The silicon wafers used have a thickness of 275±25 m with an average resistivity between 1-20 ohm-cm. The etching solution is composed of dimethylformamide/49% HF solution in a ratio of 10:1. A porous silicon film is formed by etching the wafers at room temperature with constant current density of 1-5 mA/cm$^2$ for 3-5 hours. Once the silicon substrate started cracking during the electrochemical etching, Applicants were not able to lift-off the porous silicon film layer.

EXAMPLE 1.3. Chemical Etching and Splitting

Chemical etching was performed on the cracked silicon substrate containing porous silicon film by putting the porous substrate into 1-10 ml of hydrofluoric acid (HF) and 0.1-1 ml of silver nitrate ($AgNO_3$) at room temperature for 1-10 minutes. This resulted in the coating of the silicon substrate and the porous silicon film on the silicon substrate with silver particles. After the silver coating, the porous silicon film and the cracked silicon substrate were kept in a chemical etchant (10 ml of HF and 0.1 ml of 30% hydrogen peroxide ($H_2O_2$)) for 10-120 minutes.

Next, the electrochemically/chemically etched porous silicon film and silicon substrate were placed in a DMF solution and then put into a commercial Branson Ultrasound sonicator for 30 minutes and ultrasonically crushed into a powder to form porous silicon particulates. FIGS. 3C-E shows the SEM images of the electrochemically/chemically etched porous silicon particulates.

EXAMPLE 1.4. Battery Testing of Porous Silicon Particulates

Two electrodes and three electrode cells (Hosen Test cell, Hohsen Corp. Japan) were used for all electrochemical measurements. A working electrode was prepared by drop casting PAN and electrochemically/chemically etched porous silicon particulates on stainless steel. The composition was pyrolyzed at 550° C. in an Argon atmosphere. Lithium foil (0.75 mm thick, Alfa Aesar) was used as a counter-electrode in half cell configurations. Lithium cobalt oxide ($LiCoO_2$) was used in full cell configurations. A trilayer polypropylene membrane (Celgard 2325) wetted with an electrolyte was used as a separator. The electrolyte used was 1 M $LiPF_6$ in a 1:1 ratio w/w ethylene carbonate: diethyl carbonate (Ferro Corporation) or a 1:1 ratio w/w FEC (Ferro Corporation):dimethyl carbonate (Sigma Aldrich). The anode material was not exposed to air before assembling into the cell. All the cells were assembled in an argon-filled glove box (<5 ppm of oxygen and water, Vacuum Atmospheres Co.). The electrochemical testing is performed using an Arbin Instruments BT2000. Applicants' anode material is charged and discharged between 0-1 V versus Li/Li+ at C/3 and C/2 rates for constant charge capacity (CCC) of 1000 mAhg$^{-1}$. The Coulombic efficiency (delithiation capacity/lithiation capacity) was calculated to be nearly 100%.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. An anode material comprising:
   porous silicon particulates,
      wherein each of the porous silicon particulates comprise a plurality of macropores, mesopores and micropores,
      wherein the micropores and mesopores are within the macropores, and
      wherein the micropores and mesopores within the macropores provide a textured surface on the silicon particulates;
   a coating associated with the porous silicon particulates; and
   a binding material associated with the porous silicon particulates, wherein the binding material is selected from the group consisting of carbon materials, polymers, metals, carbohydrates, and combinations thereof.

2. The anode material of claim 1, wherein the coating comprises a metal coating.

3. The anode material of claim 2, wherein the metal is selected from the group consisting of silver, copper, chromium, gold, aluminum, tantalum, lead, zinc, silicon, and combinations thereof.

4. The anode material of claim 2, wherein the metal is silver.

5. The anode material of claim 1, wherein the binding material comprises a polymer selected from the group consisting of polyacrylonitrile (PAN), pyrolyzed polyacrylonitrile (PPAN), polyvinylidene difluoride (PVDF), polyacrylic acid (PAA), carboxymethyl cellulose (CMC), and combinations thereof.

6. The anode material of claim 1, wherein the binding material comprises carbonized polyacrylonitrile.

7. The anode material of claim 1, wherein the plurality of pores comprise hierarchical pores.

8. The anode material of claim 1, wherein the porous silicon particulates have thicknesses ranging from about 10 micrometers to about 200 micrometers.

9. The anode material of claim 1, wherein the porous silicon particulates comprise pores that span at least 50% of a thickness of the porous silicon particulates.

10. The anode material of claim 1, wherein the porous silicon particulates comprise pores that span an entire thickness of the porous silicon particulates.

11. The anode material of claim 1, wherein the porous silicon particulates comprise diameters from about 1 μm to about 50 μm.

12. The anode material of claim 1, wherein the anode material has a discharge capacity of at least about 600 mAh/g over at least 50 cycles.

13. The anode material of claim 1, wherein the anode material has a discharge capacity of at least about 1000 mAh/g over at least 50 cycles.

14. The anode material of claim 1, wherein the anode material has a Coulombic efficiency of at least about 90% over at least 50 cycles.

15. The anode material of claim 1, wherein the anode material is utilized as part of a lithium ion battery.

* * * * *